March 3, 1964  R. P. BIGLIANO  3,123,068
SPHYGMOMANOMETER
Filed Oct. 5, 1961  4 Sheets-Sheet 1

INVENTOR.
ROBERT P. BIGLIANO
BY Harry J. McCauley
ATTORNEY

March 3, 1964   R. P. BIGLIANO   3,123,068
SPHYGMOMANOMETER

Filed Oct. 5, 1961   4 Sheets-Sheet 2

INVENTOR.
ROBERT P. BIGLIANO
BY *Harry J. McCauley*
ATTORNEY

March 3, 1964 R. P. BIGLIANO 3,123,068
SPHYGMOMANOMETER

Filed Oct. 5, 1961 4 Sheets-Sheet 3

INVENTOR.
ROBERT P. BIGLIANO
BY Harry J. McCauley
ATTORNEY

March 3, 1964   R. P. BIGLIANO   3,123,068
SPHYGMOMANOMETER

Filed Oct. 5, 1961   4 Sheets-Sheet 4

*INVENTOR.*
ROBERT P. BIGLIANO
BY Harry J. McCauley
ATTORNEY

United States Patent Office 3,123,068
Patented Mar. 3, 1964

3,123,068
SPHYGMOMANOMETER
Robert P. Bigliano, Wilmington, Del., assignor to E. I. du Pont de Nemours and Company, Wilmington, Del., a corporation of Delaware
Filed Oct. 5, 1961, Ser. No. 143,124
8 Claims. (Cl. 128—2.05)

This invention relates to a method and apparatus for the measurement of blood pressure, and particularly to a method and apparatus measuring blood pressure with continuous correction for interference occasioned by compressive forces imposed upon the artery in test by the body tissue adjacent the test site during the blood pressure determination.

With the progress of medical research and the monitoring of human physiological functioning in the course of strenuous or unusual activities, such as manned space flights, for example, it has become imperative to investigate the complete blood pumping cycle and, moreover, to conduct measurements uninterruptedly for long periods of time with a minimum of discomfort and inconvenience to the human subject. Attempts have been made in the past to measure blood pressure continuously, such as those disclosed in the early U.S. Patents 747,157 and 749,854; however, the latter are restricted effectively to the crude measurement of variations of pulse pressure with respect to time, without the ability to measure absolute pressure above zero reference pressure. Additionally, prior art methods do not compensate for the serious interference contributed by the unpredictable compressive force imposed on the blood vessel in test by the surrounding tissue.

Figure 1:
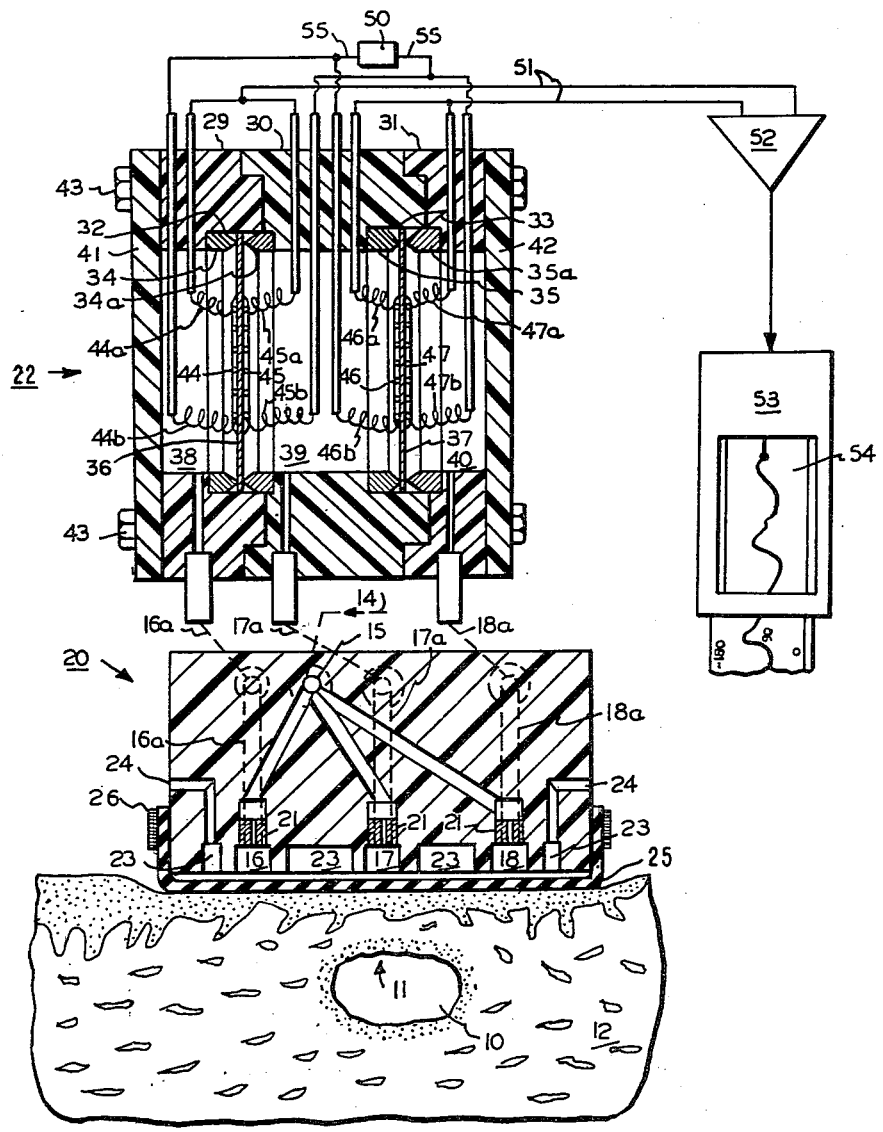
Figure 2:
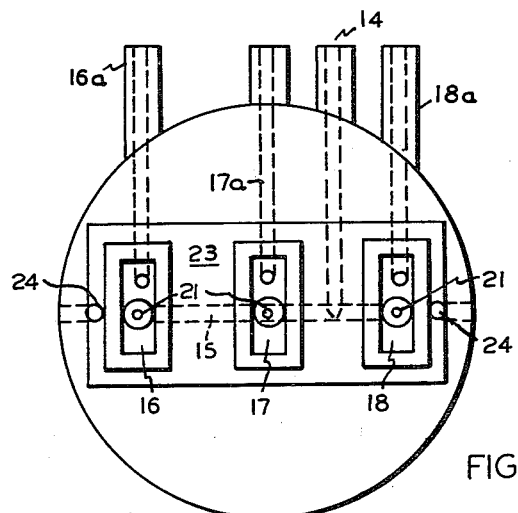
Figure 1A:
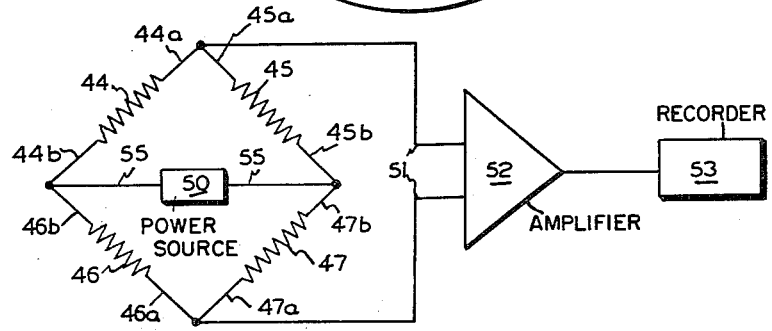
Figure 5:
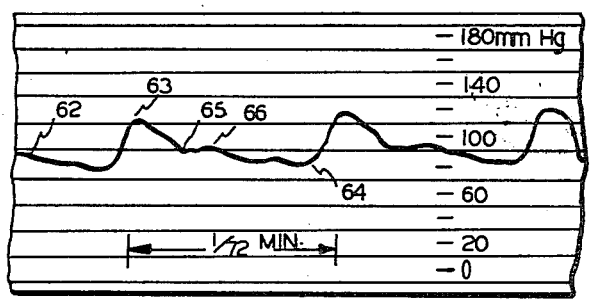
Figure 3:
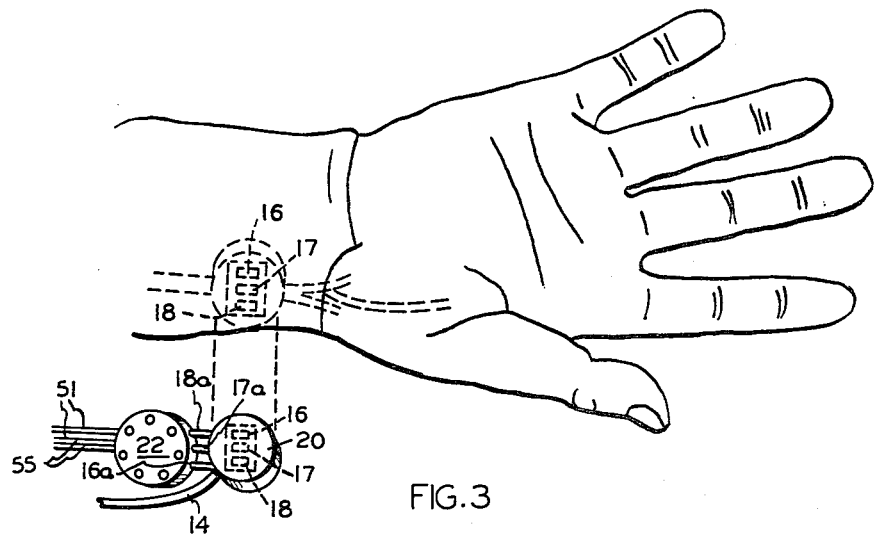
Figure 4:
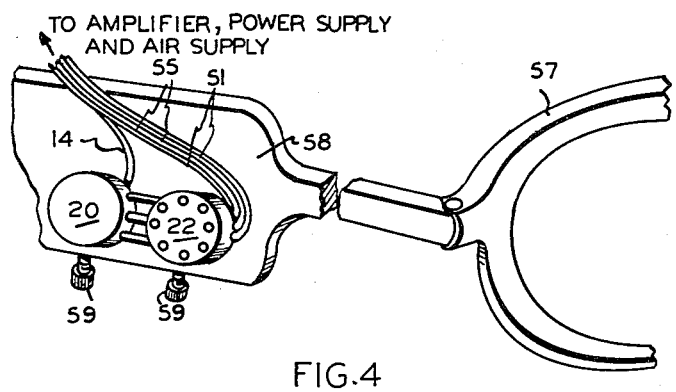
Figure 6:
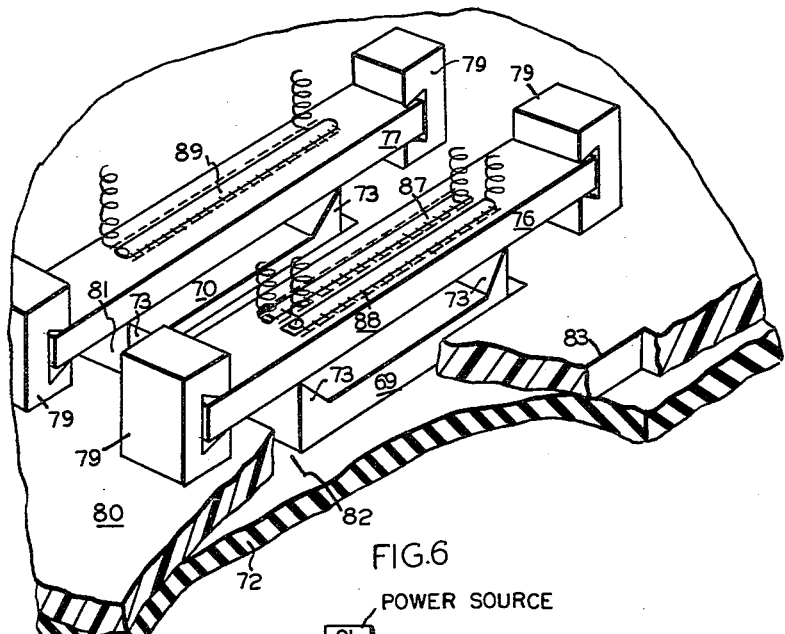
Figure 7:
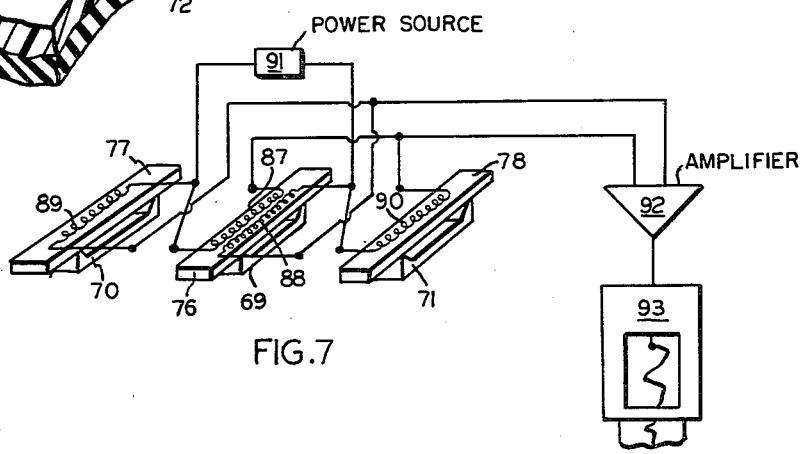
Figure 7A:
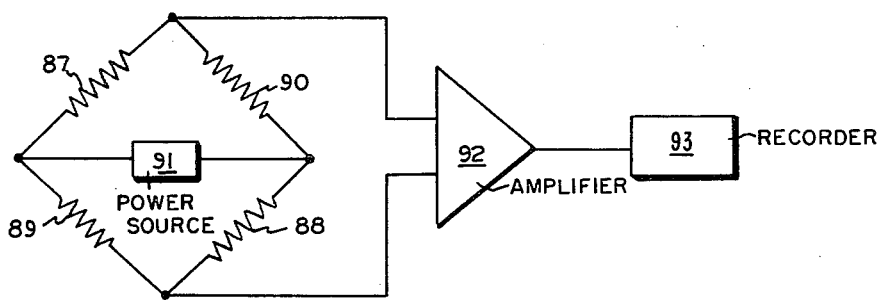

An object of this invention is to provide an improved method and apparatus for the measurement of blood pressure, a method and apparatus which are capable of monitoring the complete blood pumping cycle, and apparatus which has low mass and is rugged enough for service in space flights and other strenuous activities. Other objects of this invention are the provision of a method and apparatus which measures blood pressure continuously with improved sensitivity, and without discomfort to the subject. The manner in which these and other objects of this invention are obtained will become apparent from the following detailed description and the drawings, in which;

FIG. 1 is a partially schematic representation of a preferred embodiment of complete sphygmomanometer apparatus according to this invention employing a gas flow-type pneumatic transducer for the necessary pressure sensing, the sensing head and transducer proper being shown in longitudinal cross section, FIG. 1A is an electrical circuit diagram for the apparatus of FIG. 1, FIG. 2 is a plan view of the sensing face of a sensing head of apparatus according to FIG. 1, with the skin-contacting diaphragm removed, FIG. 3 is a partially diagrammatic representation showing the test site location of the sensing gear of the embodiment of FIGS. 1 and 2 where measurement of the blood pressure is conducted upon the radial artery of the human wrist, FIG. 4 is a fragmentary representation of a spectacle-type mount for sensing gear constructed according to the embodiment of FIGS. 1 and 2, intended for use where the measurement of the blood pressure is conducted upon the temporal artery of the human head, FIG. 5 is a reproduction of a portion of a recorded human blood pressure trace obtained with apparatus constructed according to FIGS. 1-2, wherein the test subject was a young adult male in good health in a state of rest and the test site was the radial wrist artery, FIG. 6 is a fragmentary representation of a second embodiment of sphygmomanometer constructed according to this invention utilizing strain gage elements as the pressure sensors directly, FIG. 7 is a detail view showing the arrangement of all four strain gages with respect to their deflectible beam supports for the apparatus of FIG. 6, together with the completed electrical connections to the gage elements, and FIG. 7A is an electrical circuit diagram for the apparatus of FIGS. 6 and 7.

Generally, this invention consists of a method for the measurement of blood pressure comprising imposing a first pressure localized in application to an area overlying a test artery having the width dimension less than that of the artery as depressed in test and of a magnitude sufficient to flatten the wall of the artery without interrupting the flow of blood through the artery, imposing at least one additional pressure on the body tissue adjacent the region of application of the first pressure, each said additional pressure being applied over an area substantially equal in extent to the area to which the first pressure is applied in an amount depressing the body tissue to substantially the same extent as the first pressure deflected the wall of the artery, and obtaining as the measure of the blood pressure the difference between the first pressure and the average value of the additional pressures, together with apparatus for carrying out the method.

The term "sensor" as hereinafter employed in the description and claims is intended to mean the agency which directly senses the pressure of blood within the test artery, or the pressure applied to the adjacent body tissue, as the case may be. The term "body tissue" is intended to mean the tissue adjacent a test artery, but exclusive of the test artery.

Blood pressure is most readily evaluated by measurements conducted on a relatively exposed artery, such as the radial artery of the wrist, the temporal artery of the head or the brachial artery of the elbow. In addition, these arteries are underlaid with a bony structure which opposes deflection of the artery under the compressive force of the testing agency. It is necessary to flatten the artery to a greater or lesser degree in the course of blood pressure determination and, in the case of the common cuff method routinely employed by examining physicians in physical examinations, the artery is actually pinched closed for a brief period of time. In contradistinction, blood pressure measurement according to this invention entails only a relatively slight flattening of the artery wall, without interruption of blood flow therethrough, which causes little or no discomfort to the subject and, at the same time, has absolutely no effect on bodily function, even when the blood pressure determination is conducted without a recess over a relatively long period of time.

In either case, however, flattening of the test artery in the course of blood pressure determination results in more or less pressure application to the body tissue surrounding the test artery, which thereupon reacts to oppose a counter force on the artery which, unless it is compensated, constitutes a spurious blood pressure increment in excess of the true pressure which should properly be charged to blood flow. The balance of forces applicable to the situation will be apparent upon reference to FIG. 1, wherein the test artery 10 flattened on its upper wall 11 is shown distorted from its unstressed normal round cross-section to a somewhat elliptical shape, with corresponding force transmission to the surrounding body tissue denoted generally at 12. It is a principal object of this invention to measure concurrently the total pressure allocable to blood pressure inclusive of the reactive effort opposed to the artery by the surrounding tissue and the lesser pressure allocable to the body tissue reaction solely, and then compensate for the latter by subtraction from the former, so that the net pressure obtained constitutes a close approximation to the true pressure of the blood stream in transit.

In the preferred embodiment of apparatus shown in FIGS. 1 and 2, pressure sensing is accomplished through the intermediary of a continuously flowing gas stream, such as air, which is supplied to sensing head 20 from a constant pressure source, not shown, (typically at 20–25 lbs./sq. in. gage pressure) through supply connection 14 opening into internal manifold 15, which in turn discharges through orifices 21 (typically 0.0067″ dia. x 0.020″ long) into open-ended pressure-sensing chambers 16, 17 and 18. Orifices 21 preserve sonic flow of the air therethrough, rendering the weight time rate of supply of the sensing air flow independent of the pressure existing in each of the three chambers 16, 17 and 18. Each pressure-sensing chamber is provided with a tube 16a, 17a and 18a, respectively, in open communication with individual compartments of the pressure-to-electrical transducer indicated generally at 22.

Measuring air is continuously discharged from the apertures of chambers 16, 17 and 18 opening on the sensing face side of head 20, and it is preferred to provide a symmetrically disposed venting facility for this air. This is accomplished by undercutting the head in the area surrounding the chamber apertures to form thereby a common discharge manifold 23, which is provided with oppositely disposed vents 24 communicating with the atmosphere. Finally the sensing face is closed off with a thin elastic, but unstretched, impermeable diaphragm 25, such as one fabricated from dental dam sheet rubber 8.5 mils thick, which is retained on the head with a friction clamp 26.

Turning now to the description of transducer 22, the pressure connections to which are represented schematically by the broken line extensions 16a, 17a and 18a, this consists centrally of a built up structure made up of annuli 29, 30 and 31, undercut circumferentially around the opposed inside peripheries at 32 and 33 to afford seats for oppositely disposed metal ring pairs 34—34a and 35—35a which, between them, securely clamp thin metal diaphragms 36 and 37, (typically, 5 mil thick beryllium-copper alloy plate circular in shape, 0.6″ dia.), to thereby define hermetically sealed air pressure chambers 38, 39 and 40. The outside walls of chambers 38 and 40 are solid plates 41 and 42, respectively, which are held in assembly with the other body components of transducer 22 by through bolts 43. The opposite sides of diaphragms 36 and 37 are provided with individual SR–4 spiral-element strain gages of 120 ohm resistance value, denoted 44, 45, 46, and 47, adhered thereto and connected in conventional Wheatstone bridge circuit, detailed in greatest clarity in FIG. 1a, via leads 44a, 44b, 45a, 45b, 46a, 46b, and 47a, 47b. The bridge circuit is supplied with power through leads 55 from the source 50, which may be either D.-C. or A.-C., depending upon the design of the amplifier utilized, and the output signal is delivered through leads 51 to the voltage amplifier 52. The output of the amplifier is delivered to recorder 53, which traces out a continuous indication of the absolute blood pressure on a running chart 54. Conveniently, the amplifier, recorder and power source are obtainable as an assembled unit, one commercial design which is satisfactory being the Sanborn Model 301.

In the design of apparatus hereinbefore described, pressure chamber 17 is reserved for blood pressure sensing, whereas the two chambers 16 and 18 sense the pressure which is compensable as body tissue reaction on opposite sides of the test artery 10, FIG. 1. It is desirable that the lateral dimension of the aperture of chamber 17 confronting the subject's skin be preferably only about ½ to ⅔ of the diameter of the test artery in its unstressed condition, so that only a small compression of the artery will produce a flat localized region opposite the diaphragm covering the aperture of 17, without danger of collapsing the vessel and totally cutting off blood flow therethrough, or of causing discomfort to the user. For an artery 4 mm. inside dia., 5.5 mm. outside diameter, for example, the radial artery of the wrist, a suitable width of chamber 17 aperture was 2 mm. Circularly shaped apertures can be employed; however, rectangular apertures of the design shown in FIG. 2 are preferred, in which case a longitudinal dimension of 6 mm., to be oriented lengthwise of the test artery, has proved satisfactory. For larger arteries, such as the brachial artery of the arm, which typically measure 5 mm. inside dia., 7.5 mm. outside dia., larger apertures can be employed and, generally, the largest size aperture which can be used is desirable because of the added comfort to the subject. The dimensions of the body-tissue-overlying apertures 16 and 18 are less critical, except that they should define substantially equal pressure-sensing areas for development of the compensatory signals on the outer sides of the diaphragms 36 and 37 constituting walls of compartment 39.

It is, of course, desirable to construct all pressure sensing components in small size and of light weight, high strength materials in order to minimize the time response of the apparatus and the mass subjected to inertial drag. Accordingly, high strength polymers, such as those typified by the polyamide and acetal resins, are preferred as materials of construction for head 20 and transducer 22, as well as for connecting tubing and the cases of auxiliary equipment wherever possible.

In operation, sensing head 20 is precisely located with respect to the test artery with rubber diaphragm 25 contacting the subject's skin, as shown for the wrist mounting of FIG. 3, with aperture 17 overlying the artery generally centrally thereof, widthwise, and aligned longitudinally lengthwise thereof. Conveniently, both sensing head 20 and transducer 22 can be secured against movement relative to the body member by the use of wrist watch straps or a like harness, not detailed, secured firmly about the wrist. Where the test artery is the temporal artery of the head, the spectacle frame mounting of FIG. 4 is particulary convenient. In this support the conventional eye glass or goggle frame 57 is provided with an enlarged temple portion 58, apertured to receive the sensing face of head 20 in firm contact with the subject's skin as well, as the associated transducer 22. Retention of these components within temple 58 is facilitated by the use of set screws 59.

Assuming that the sensing head is positioned at the test site as hereinbefore described, operation is initiated by merely opening the air supply valve (not shown) in line 14, whereupon pressure builds up within chambers 16, 17 and 18 to values which are just sufficient to deflect the confronting areas of diaphragm 25 away from the chamber apertures and thereby open hairline cracks (of the order of 0.0001″ width) around the aperture peripheries to exhaust air to discharge manifold 23. The magnitudes of these pressures, transmitted to transducer 22 through connections 16a, 17a and 18a, are very accurate measures of the blood pressure and the tissue compressive pressure to be compensated as hereinbefore described.

The function of diaphragm 25 is that of an intermediary furnishing a uniformly smooth but virtually zero force-deflectible surface in confrontation with both the apertures of pressure chambers 16, 17 and 18 and the skin of the test subject, since disproportionate anomalies in operation otherwise arise due to air leakage gaps created by individual hairs growing from the subject's skin, or even from the varying roughness in skin texture existing in the region where blood pressure measurement is conducted.

The sphygmomanometer design herein described in detail which employs a pair of oppositely disposed body-tissue depression compensation transducer compartments 38 and 40 is particularly preferred, because of the inherent compensation which it affords for any slight cocking of sensing head 20 out of parallelism with the plane of the subject's skin. However, an alternate, somewhat less preferred design of apparatus consists of a transducer incorporating only a single diaphragm, on one side of which there is applied the blood pressure sensing signal from pressure chamber 17 whereas on the other side is applied a reference pressure derived from a single pressure chamber 16 or 18, the aperture of which is substantially equal in area to the aperture of sensing chamber 17. An apparatus so constructed operates as satisfactorily as the preferred design, except that more care is required in the mounting.

Referring to FIG. 5, the blood pressure record chart trace 62 obtained with the apparatus of this invention on a healthy adult male in a state of rest is portrayed for several cycles, with the absolute blood pressure scale drawn in as an ordinate reference and the time interval for a single complete heart pumping cycle (1/72 min.) as abscissa. It will be seen that the systolic pressure 63 and the diastolic pressure 64 are both well defined, whereas the dicrotic notch 65 and peak 66 are also clearly evident. The accuracy of measurement obtained by use of this invention is close to that hitherto possible only with arterial catheterization, while safeguarding the subject from all discomfort and even retaining his freedom of bodily movement to a very high degree.

A mechanical model duplicative in force response to that of an artery and its surrounding body tissue is that consisting of a thin-walled rubber tube (e.g., 3/16" outside dia.) embedded at close clearance within a surrounding mass of upholstery grade flexible polyurethane sponge about 3/4" thick. When the tube is just filled with water, so that it is inflated but not stretched, e.g., at 1" water head, a single aperture pneumatic measuring head constructed as hereinbefore described for the pressure-sensing chamber 17, senses equal forces in the separate regions overlying the tube and also overlying the sponge when applied in sequence to each of these regions. In contradistinction, when substantial pressure is applied to the water, tube, e.g., 100 mm. Hg the two sensed pressures are vastly different, and, in fact, the difference is found to constitute substantially the pressure of water in the tube, i.e., 100 mm. Hg.

Artery deflection per se does not contribute any appreciable force component requiring compensation, as was borne out by an experiment conducted on a surgically exposed artery of an anesthetized dog. In this instance, a single blood pressure-sensing chamber 17 having dimensions of aperture limited to less than the diameter of the artery in slightly flattened, as-tested condition as hereinabove described, gave a blood pressure measurement in complete agreement with the absolute blood pressure of the dog as simultaneously sensed by a catheter inserted internally of the same artery.

Another embodiment of this invention which dispenses with a flowing air column as the pressure-transmitting intermediary is that shown in FIGS. 6, 7 and 7a. This design employs strain gages mounted on deflectible beam supports for direct measurement of both the artery pressure and the body tissue pressure, the pressure transmitting agencies being small-sized, low mass elements 69, 70 and 71, cemented or otherwise fixedly attached to a rubber diaphragm 72 identical in all respects with diaphragm 25 of FIG. 1. The pressure transmitters, only two of which are shown in FIG. 6 but all three of which are represented in FIG. 7, are of identical design, incorporating on the upper side knife edges 73 at opposite ends which are adapted to bear against the undersides of the individual strain gage beam support members 76 (for the artery-overlying pressure sensor) and 77 and 78 (for each of the two body tissue-overlying sensors disposed on opposite sides of the artery site). These supports can, of course, be made very small in size, typically, 1/4" x 0.001" thick x 1/128" wide, and are preferably fabricated of rigid polymeric materials such as hereinbefore described for head 20 and transducer 22. Beams 76, 77 and 78 are supported in a common horizontal plane by notched end supports 79 integral with the stiff sensing head face plate 80, which latter is cut away to provide apertures 81, 82 and 83 clearing the associated transmitters, so that there is no binding interference with free movement thereof in a vertical direction responsive to the pressures being sensed.

The transducing function with this embodiment is accomplished by strain gages adhered to the upper surfaces of the deflectible beams and it is advantageous to utilize two such strain gages, namely, 87 and 88 attached to the center beam 76 overlying the artery, and only a single strain gage 89 and 90 attached to the outside beams 77 and 78, respectively. It is preferred to use filamentary semiconductor strain gages, such as those fabricated from silicon or similar materials, for this service, because the change in resistance with pressure response is of the order of 100 times that of conventional strain gages.

The strain gages are connected in Wheatstone bridge circuit in the same configuration as that already described for FIGS. 1 and 1A, the circuit for this embodiment being shown in FIGS. 7 and 7a. Thus, the power source 91 is connected between junctions placing strain gages 87 and 88 on opposite sides of the bridge, so that double effect is obtained for a given deflection of beam 76. The bridge output electrical signal is transmitted to voltage amplifier 92, similar to 52, and the output of the amplifier indicated on a chart recorder 93.

To utilize the sphygmomanometer of FIGS. 6, 7 and 7a, the sensing head is oriented so that the longitudinal axis of pressure transmitter 69 is aligned substantially co-parallel with the test artery. With the skin-contacting areas of 69, 70 and 71 proportioned as described for the embodiment of FIGS. 1, 1a and 2, there is obtained essentially the same blood pressure measurement record, again corrective, because of the configuration of the bridge circuit, for any slight out-of-plane tilting of one body tissue-overlying pressure transmitter over the other.

Calibration of the several embodiments of this invention is readily accomplished in the following ordered sequence: (1) Simultaneously apply known pressures throughout the full working range of interest to all sensors of the apparatus. The differential output of transducer 22 should remain zero throughout, and, if it does not, there exists a mismatch of the strain gages or a mechanical component mismatch, e.g., differences in flexibility of diaphragms 36 and 37 or in leverages of the beam system (embodiment of FIGS. 6, 7 and 7A), or asymmetry in the mounting of the strain gages. (2) After correction of any mismatch found in step (1), pressure is applied over the full range of interest to the sensor which, in service, is intended to overlie the artery to be tested, the remaining sensors being exposed only to atmospheric pressure. The bridge output recorded should vary proportionately with the applied calibrating pressure, whereupon the recorded trace constitutes the desired calibration of this sensor of head 20. (3) Finally, calibrating pressure is applied separately to the sensors intended in service to overlie the body tissue, and the corresponding outputs determined. In this step, since the reference sensors are connected to one another in such a way as to obtain the average value of their outputs, all but one of them is at atmospheric pressure during the calibration, so that the indicated pressure corresponds to the applied calibrating pressure divided by the number of reference sensors. It is thereby established that each reference sensor in fact produces an output corresponding in the appropriate fraction to the applied calibrating pressure.

The calibration apparatus can conveniently comprise an adjustable, pneumatic pressure chamber provided with two different sized openings covered over with thin sheet rubber. One such opening can be made large enough to accommodate the entire testing face of head 20, so as to subject all sensors simultaneously to the same test pressure. The other chamber opening is adapted to subject only one sensor to a given pressure at any one time and, accordingly, is made smaller in size, so as to permit the ready accomplishment of steps (2) and (3) hereinbefore described.

From the foregoing it will be apparent that this invention can be modified in numerous respects, such as by utilization of different transducing elements than strain gages, and in many other ways without departure from the essential spirit, and it is intended to be limited only by the scope of the following claims.

What is claimed is:

1. A method for the measurement of blood pressure comprising imposing a first pressure localized in application to an area overlying a test artery having the width dimension less than that of the artery as depressed in test and of a magnitude sufficient to flatten the wall of said artery without interrupting the flow of blood through said artery, simultaneously imposing at least one additional pressure on the body tissue adjacent the region of application of said first pressure, each said additional pressure being applied over an area substantially equal in extent to the area to which said first pressure is applied in an amount depressing said body tissue to substantially the same extent as said first pressure deflected said wall of said artery, and obtaining as the measure of said blood pressure the difference between said first pressure and the average value of said additional pressures.

2. A method for the measurement of blood pressure according to claim 1 wherein two said additional pressures are simultaneously applied, each on an opposite side of said artery and approximately equidistant therefrom.

3. A sphygmomanometer comprising in combination a sensing head adapted to be attached securely in place upon the body of a subject with face pressed against the skin of said subject provided with an artery-overlying first pressure sensor having an area confronting said skin limited in width dimension to less than that of the artery as depressed in test and at least one body tissue-overlying additional pressure sensor of sensing area equal to said area of said first pressure sensor, said first pressure sensor and said additional pressure sensor being adapted, respectively, to deflect the wall of said artery and to depress the body tissue adjacent said artery substantially equally, means developing the pressure differential consisting of the output of said first pressure sensor minus the average output of said additional pressure sensor, and means responsive to said pressure differential indicating the pressure of blood in transit through said artery.

4. A sphygmomanometer according to claim 3 wherein said first sensor and said additional sensor are individual strain gage elements mounted on supports deflectible as a function of the pressure imposed on said supports.

5. A sphygmomanometer comprising in combination a sensing head adapted to be attached securely in place upon the body of a subject with face pressed against the skin of said subject provided with a first gas pressure chamber having an artery-overlying aperture of area limited in width dimension to less than that of the artery as depressed in test and at least one additional gas pressure chamber provided with a body tissue-overlying aperture of area substantially equal to the area of said artery-overlying aperture but spaced therefrom a distance clearing the test artery during the blood pressure measurement operation, means adapted to apply gas pressures to said first gas pressure chamber and to said additional gas pressure chamber in amounts operative, respectively, to deflect the wall of said artery and to depress the body tissue adjacent to said artery substantially equally, means developing the pressure differential consisting of the pressure existing in said first gas pressure chamber minus the average pressure existing in said additional gas pressure chamber, and means responsive to said pressure differential indicating the pressure of blood in transit through said artery.

6. A sphygmomanometer according to claim 5 provided with an individual said additional gas pressure chamber with body tissue-overlying aperture opening on a preselected side of said artery-overlying aperture of said first said gas pressure chamber and another individual said additional gas pressure chamber with body tissue-overlying aperture opening on a side opposite said preselected side of said artery-overlying aperture of first said gas pressure chamber, each said body tissue-overlying aperture being disposed approximately equidistant from said artery-overlying aperture.

7. A sphygmomanometer comprising in combination a sensing head adapted to be attached securely in place upon the body of a subject with face pressed against the skin of said subject provided with a first gas pressure chamber having an artery-overlying aperture of area limited in width dimension to less than that of the artery as depressed in test and at least one additional gas pressure chamber provided with a body tissue-overlying aperture of total area substantially equal to the area of said artery-overlying aperture but spaced therefrom a distance clearing said test artery during the blood pressure measurement operation, means adapted to apply gas pressures to said first gas pressure chamber and to said additional gas pressure chamber in amounts operative, respectively, to deflect the wall of said artery and to depress the body tissue adjacent to said artery substantially equally, said means applying said gas pressures consisting of a substantially constant pressure source of gas having a capacity sufficient to deliver gas at substantially constant flow rate to each said first gas pressure chamber and said additional gas pressure chamber with throttled exhaust in the plane of said sensing head adjacent said body of said subject, means developing the pressure differential consisting of the pressure existing in said first gas pressure chamber minus the average pressure existing in said additional gas pressure chamber, and means responsive to said pressure differential indicating the pressure of blood in transit through said artery.

8. A sphygmomanometer according to claim 7 wherein said face of said sensing head is provided with a gas venting passage opening to the atmosphere disposed with inlet approximately equidistant from said artery-overlying aperture and from said body tissue-overlying aperture and wherein said face of said sensing head is overlaid with an air-impermeable membrane biased lightly against each said aperture and said gas venting passage inlet so as to define therewith a gas exhaust passage from said first gas pressure chamber and said additional gas pressure chamber to atmosphere.

References Cited in the file of this patent

UNITED STATES PATENTS

| | | |
|---|---|---|
| 2,272,836 | Gerdien | Feb. 10, 1942 |
| 2,478,372 | Colegrave | Aug. 9, 1949 |
| 2,549,049 | Bierman | Apr. 17, 1951 |
| 2,658,505 | Sheer | Nov. 10, 1953 |
| 2,875,750 | Boucke | Mar. 3, 1959 |
| 2,960,086 | Keller | Nov. 15, 1960 |